W. H. KEMPTON.
INSULATION AND METHOD OF MAKING SAME.
APPLICATION FILED JULY 25, 1918.

1,416,036.  
Patented May 16, 1922.

WITNESSES:  
H. B. Funk  
O. E. Bee

INVENTOR  
Willard H. Kempton  
BY  
Wesley G. Carr  
ATTORNEY

UNITED STATES PATENT OFFICE.

WILLARD H. KEMPTON, OF WILKINSBURG, PENNSYLVANIA, ASSIGNOR TO WESTINGHOUSE ELECTRIC & MANUFACTURING COMPANY, A CORPORATION OF PENNSYLVANIA.

INSULATION AND METHOD OF MAKING SAME.

1,416,036.

Specification of Letters Patent.    Patented May 16, 1922.

Application filed July 25, 1918. Serial No. 246,764.

*To all whom it may concern:*

Be it known that I, WILLARD H. KEMPTON, a citizen of the United States, and a resident of Wilkinsburg, in the county of Allegheny and State of Pennsylvania, have invented a new and useful Improvement in Insulations and Methods of Making Same, of which the following is a specification.

My invention relates to improvements in insulation, and it has for its primary object the provision of an insulation which shall have great dielectric strength as well as great mechanical strength.

It is well known that mica possesses very desirable insulating qualities but it also has little mechanical strength by reason of its poor adhesive properties. In view of this, one object of my invention is to provide an insulation in which mica may be used and wherein its low mechanical strength will be supplemented by another insulating material which possesses great mechanical strength.

Another object of my invention is to provide a composite insulation in which two insulators may be used, one of which will protect the other from relatively large temperature changes and from the action of oils, weak acids and alkalis.

A still further object of my invention is to provide a composite insulation in which the dielectric and mechanical strength may be varied at different portions by judicious placing of the different materials.

Figure 1:
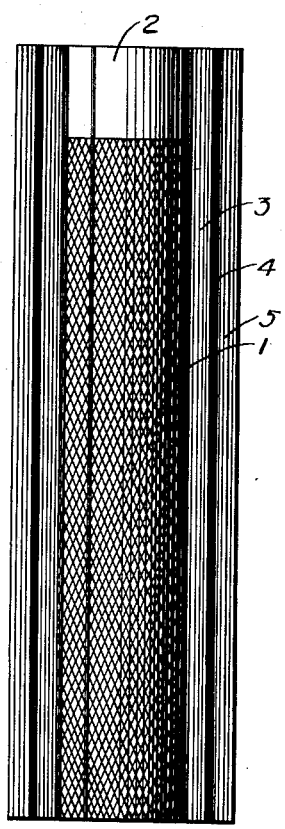
Figure 2:
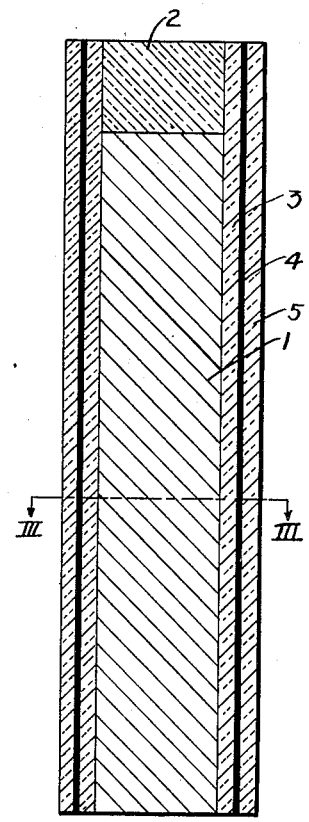
Figure 3:
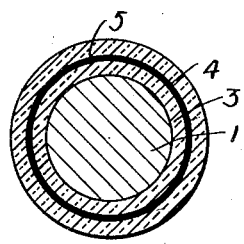

With these and other objects in view, a better understanding of my invention may be had by reference to the drawings in which Fig. 1 is a longitudinal, diametral, sectional view showing a shaft insulated in accordance with my invention, the shaft being in elevation; Fig. 2 is a view similar to Fig. 1, but with the shaft in section; Fig. 3 is a section taken on the line III—III of Fig. 2.

In practising my invention, I may wind a plurality of convolutions of impregnated sheet material about the object to be insulated after which I may place a winding or a plurality of windings of mica, as desired, over the impregnated sheet material. About the body thus formed, more windings of impregnated sheet material may be placed, the whole body then being placed in a mold and subjected to heat and pressure to compact and harden the windings of insulating material which have been wrapped about the object to be insulated.

In Fig. 1, in order to illustrate my invention, I have shown a metal shaft 1 which is preferably roughened on its outer surface. If so desired, a preformed plug 2, which is composed of insulating material, may be placed on one end of the shaft and a plurality of convolutions of impregnated sheet material 3 may be loosely wound about the shaft 1 and the plug 2. The impregnated sheet material 3 may be fibrous sheet material, such as paper, duck or muslin, suitably impregnated with a binder, such as a phenolic condensation product, for example, bakelite. A layer 4 of sheet mica or mica splittings, which may or may not be built up into sheet form by the use of a binder, such as shellac, and then be placed about the impregnated sheet material 3, the thickness of the mica 4 being governed by the degree of insulation required. About the mica 4, another series of layers 5, of material, which is similar to the material 3, may be wound. The body thus built up may be placed in a suitable mold and subjected to heat and pressure to compact the windings about the shaft and to harden the binder.

The mica, thus disposed between the windings of impregnated sheet material, is securely held in place by reason of the great mechanical strength of the layers 3 and 5 which are compacted by high pressure in molding. If so desired, several layers of mica may be used, it being necessary only to locate it between layers of impregnated sheet material. The mica may also be located only where great dielectric strength is required, instead of being coextensive with the material having great mechanical strength.

Although, in the drawings, I have shown a shaft insulated according to my invention and have used it as an example in describing my invention, it is obvious that this insulation may be applied to any form of body requiring insulation, the only difference being in the shape of the mold required for compacting and hardening the material. My invention consists broadly of employing mica as an insulator on objects which require relatively high insulation and are subjected to vibration and shocks while in use.

Heretofore, the use of mica has been limited, by reason of its disintegration, when subjected to hard usage but may now be employed freely in accordance with my invention.

It being obvious that variations from what I have specifically described may be made in practising my invention, I desire that no limitations shall be imposed except such as are indicated in the appended claims.

I claim as my invention:

1. A molded composite insulation comprising a material which has great dielectric strength disposed between a plurality of layers of sheet material impregnated with a hardened binder.

2. A molded composite insulation comprising a material which has great dielectric strength disposed between a plurality of layers of sheet material impregnated with a hardened phenolic condensation product as a binder.

3. A molded composite insulation comprising mica molded between layers of sheet material impregnated with a hardened binder.

4. A molded composite insulation comprising mica disposed between layers of sheet material impregnated with a hardened phenolic condensation product as a binder.

5. A molded composite insulation comprising sheet mica disposed at desired intervals between a plurality of layers of sheet material impregnated with a hardened phenolic condensation product as a binder.

6. A method of insulating objects that comprises disposing layers of impregnated sheet material about the object, interposing material which has great dielectric strength between the layers and molding the built-up body.

7. A method of insulating objects which comprises covering the objects with layers of sheet material impregnated with a binder and with interposed mica and molding the body thus formed.

8. A method of insulating objects which comprises winding a plurality of superimposed convolutions of impregnated sheet material about the object, surrounding these windings by mica, then winding another series of superimposed convolutions of impregnated sheet material about the mica and molding the body thus formed.

9. An article of manufacture comprising a conductor and an insulating cover molded thereon, including a material which has great dielectric strength disposed between a plurality of layers of sheet material impregnated with a hardened binder.

10. An article of manufacture comprising a conductor and an insulating cover molded thereon, including a material which has great dielectric strength disposed between a plurality of layers of sheet material impregnated with a hardened phenolic condensation product.

11. An article of manufacture comprising a conductor and an insulating cover molded thereon, including mica disposed between a plurality of layers of sheet material impregnated with a hardened binder.

12. An article of manufacture comprising a conductor and an insulating cover molded thereon, including mica disposed between a plurality of layers of fibrous sheet material impregnated with a hardened binder.

In testimony whereof, I have hereunto subscribed my name this 22nd day of July 1918.

WILLARD H. KEMPTON.